(12) United States Patent
Giles, III

(10) Patent No.: US 7,584,927 B2
(45) Date of Patent: Sep. 8, 2009

(54) PRE-CHUTE DEPLOYMENT SKYDIVER DECELERATION DEVICE

(76) Inventor: Tommy H Giles, III, 2814 Ramsey Rd., Columbus, GA (US) 31903

(*) Notice: Subject to any disclaimer, the term of this patent is extended or adjusted under 35 U.S.C. 154(b) by 4 days.

(21) Appl. No.: 12/044,673

(22) Filed: Mar. 7, 2008

(65) Prior Publication Data

US 2008/0149774 A1  Jun. 26, 2008

Related U.S. Application Data

(63) Continuation-in-part of application No. 11/282,903, filed on Nov. 18, 2005, now abandoned.

(51) Int. Cl.
*B64D 25/10* (2006.01)
(52) U.S. Cl. .................. 244/142; 244/147; 244/149
(58) Field of Classification Search .............. 244/142, 244/147, 149, 150
See application file for complete search history.

(56) References Cited

U.S. PATENT DOCUMENTS

| | | | |
|---|---|---|---|
| 1,194,691 A | 8/1916 | Adams | |
| 1,266,508 A | 5/1918 | Ludtke | |
| 1,287,134 A | 12/1918 | Swanson | |
| 1,325,108 A | 12/1919 | Peterson | |
| 2,196,947 A | 4/1940 | Swofford | |
| 2,566,585 A | 9/1951 | Smith | |
| 2,754,074 A | 7/1956 | Schade | |
| 3,385,539 A | 5/1968 | Ewing et al. | |
| 3,511,458 A | 5/1970 | Rolandelli | |
| 3,633,507 A | 1/1972 | Morley | |
| 5,005,785 A | 4/1991 | Puskas | |
| 5,598,900 A | 2/1997 | O'Rourke | |
| 5,722,619 A | 3/1998 | Cottle | |
| 5,738,307 A * | 4/1998 | Webb | .......... 244/152 |

* cited by examiner

*Primary Examiner*—J. Woodrow Eldred
(74) *Attorney, Agent, or Firm*—QuickPatents, Inc.; Kevin Prince

(57) ABSTRACT

A parachute deployment deceleration assist device for a jumper is disclosed that includes an inverted pocket formed from at least one web of material. The device further includes at least one removable harness attachment means fixed to a peripheral edge of the pocket. Each harness attachment means is selectively attachable to a harness assembly of a parachute between a canopy thereof and the jumper, preferably at a connector link and within easy reach of the jumper when the parachute is fully deployed. In use, before the canopy is inflated the inverted pocket inflates and aids in the deceleration of the jumper, reducing the shock experienced by the jumper upon full inflation of the canopy. Once the canopy is fully inflated and the jumper is falling at a substantially constant speed, the jumper may reach up to remove the device from the harness assembly.

11 Claims, 3 Drawing Sheets

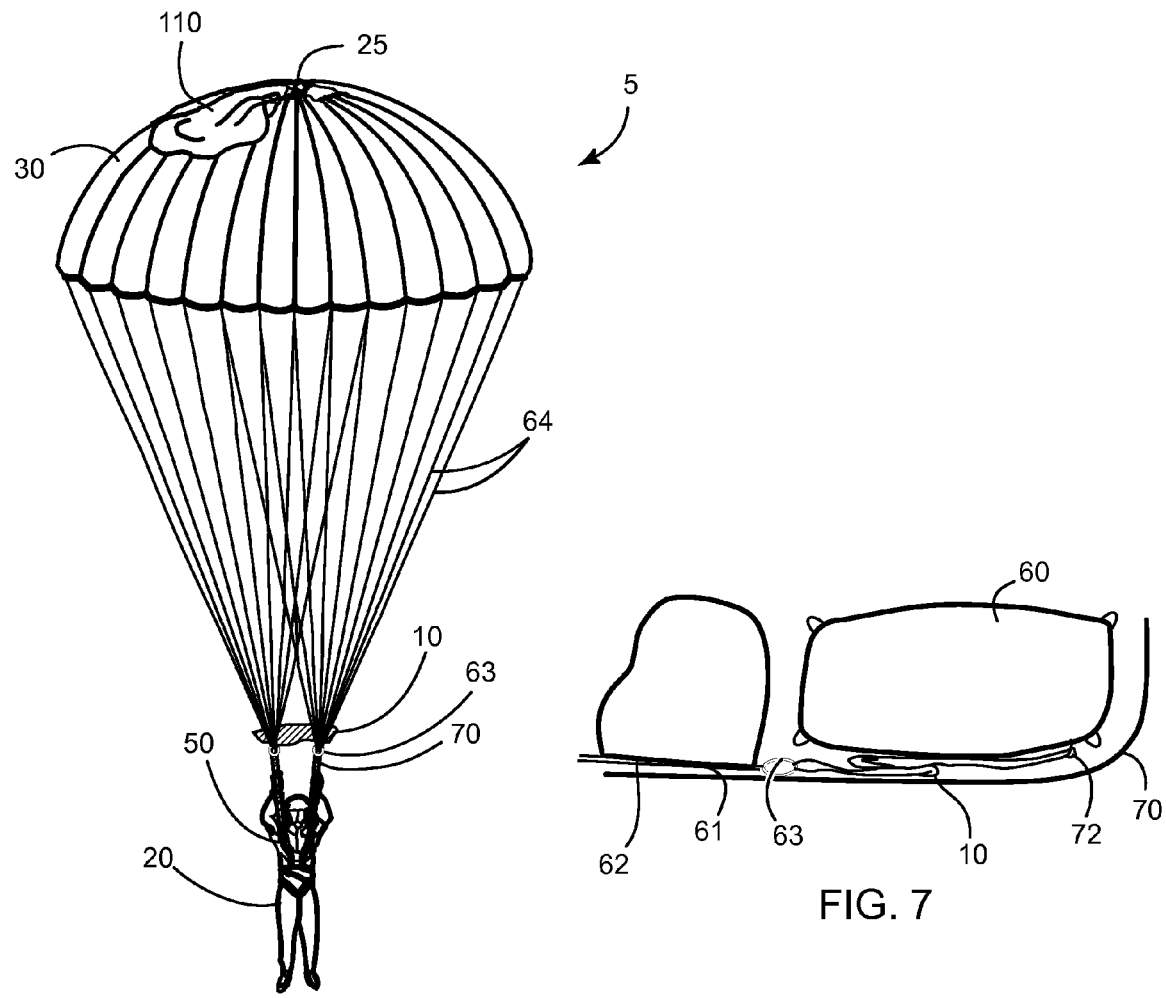
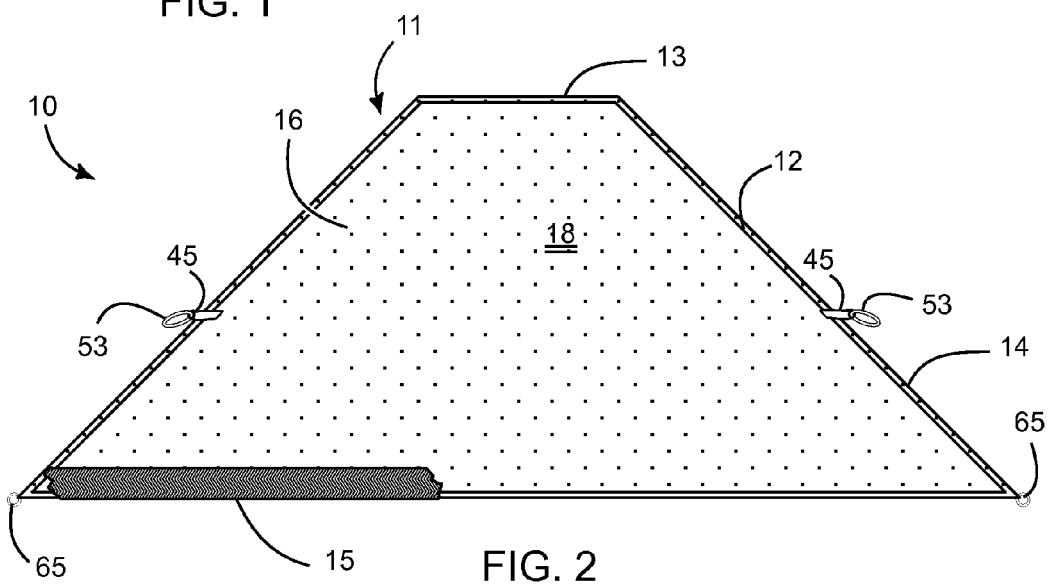

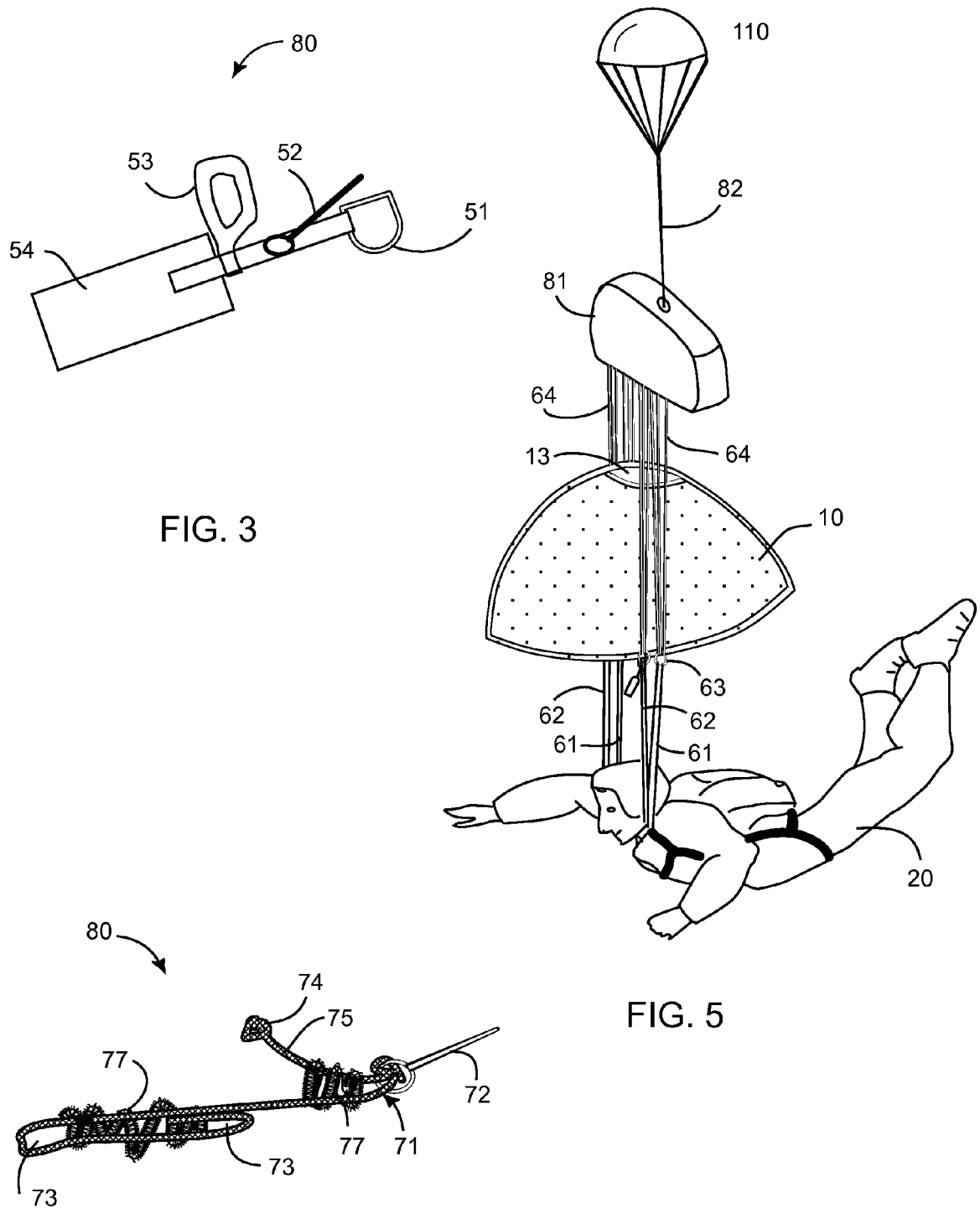

PRE-CHUTE DEPLOYMENT SKYDIVER DECELERATION DEVICE

CROSS-REFERENCE TO RELATED APPLICATIONS

This application is a continuation-in-part of U.S. patent application Ser. No. 11/282,903, filed on Nov. 18, 2005, and incorporated herein by reference.

STATEMENT REGARDING FEDERALLY SPONSORED RESEARCH AND DEVELOPMENT

Not Applicable.

FIELD OF THE INVENTION

This invention relates to parachutes, and more particularly to a parachute deployment deceleration assist device.

DISCUSSION OF RELATED ART

This invention relates to the opening sequence of a deploying parachute, specifically to attenuate the opening shock forces, the snatch force and the canopy opening force.

A parachute system typically consists of a suspended weight (referred to as the "jumper" herein), a harness that attaches the parachute to the jumper, a container for holding a packed parachute during freefall, a canopy of flexible material to slow the decent of the jumper, and suspension lines that attach the canopy to the harness via risers and connector links and suspension lines. Typically there are four risers attached to the harness. At the end of each riser there is normally a metal oval connector link or ring. The suspension lines are attached, in groups, to the connector links that are themselves attached to the risers which are attached to the harness. The canopy is normally contained in a bag to make packing easier and to help attenuate the opening shock during canopy deployment. A pilot chute is also often attached to the bag or canopy and is used to extract the bag or canopy from the container. With so-called "ram-type" air parachutes a slider is normally used. It normally consists of a rectangular piece of material with four grommets in the corners. The four line groups from the canopy are routed through the grommets. The slider is pushed up to the bottom of the canopy during packing. During deployment the Slider "slides" down the lines to the Connector Links. This slows down and provides an orderly canopy deployment.

Two main opening shock forces are the so-called "snatch force" and "canopy opening shock." The snatch force is when the suspension lines are fully extended and the canopy is accelerated to the speed of the jumper. This is very sudden, sharp and completed relatively quickly, such as in less than a second. Next, the canopy will began to spread from its packed position to its fully inflated condition. With proper attenuation (i.e. bag, slider and proper design) and packing technique the canopy opening shock will be spread over a short duration of several seconds. The canopy opening shock may be less than the snatch force but of longer duration. Both types of forces are referred to herein as simply "shock forces."

Older style parachutes having round canopies use material with a porosity that allows air to penetrate therethrough. Such canopies also have suspension lines that stretch when a load is applied. When packed in a deployment device, such as a sleeve or bag, or the like, generally the opening shock is relatively minor.

Almost all modern parachutes, with the exception of some military, emergency and special use type parachutes, are of the so-called "ram-air" type. The material used in such parachutes is of low or zero porosity, and such chutes have non-elastic suspension lines. Such parachutes aerodynamically act like an airfoil and need to maintain the airfoil shape in order to function properly. Further, with such parachutes the opening shock is relatively high.

The original slider was developed in the 1970's. Typically such a device is a rectangular material with four grommets or rings in the corners. The suspension lines feed through 4 grommets or rings. The slider is pressed against the canopy during packing to restrict the canopy initially and allow it to open in a controlled manner. Sometimes a pocket is sewed on a leading edge of the slider to further control the opening of the parachute. Sliders are used on almost all ram-air canopies today. There have been patents issued on variations of the basic slider.

Tandem parachutes having a passenger attached to a tandem master with an extra large canopy use a drogue parachute to slow the passenger/tandem master during freefall to the speed of a single jumper in freefall. Some older style round-type parachutes have a center line to pull down the apex of the canopy to increase the size of the canopy. Normally such round-type parachutes also include a small opening or vent at the apex to increase stability. A small pilot chute is also often packed to engage the wind stream and pull the main canopy away from the jumper for deployment.

The opening shock of parachutes has been dependent on the difference in the velocity of the jumper and canopy upon the riser and suspension lines achieving completed stretched straight, and then the speed of full canopy deployment. Opening shock may be perceived differently by different jumpers. Clearly opening of the canopy shortly after exiting the aircraft, that is, before the jumper reaches terminal velocity, results in less opening shock than when opening the same canopy at terminal velocity (that is, the maximum speed of a freefalling jumper). A larger jumpsuit, reduction in jumper weight, lighter canopy, smaller pilot chute, slower canopy opening speed, and packing procedure used are all factors that may be used to reduce the opening shock.

There is a multitude of prior art pertaining to parachutes, pilot chutes, drogue chutes and slider variations. Pilot chutes and drogue chutes are used to extract the main chute or stabilize the load prior to the main chute deploying.

For example, U.S. Pat. No. 2,754,074 to Schade on Jul. 10, 1956, teaches a parachute control means that has a small decelerating affect on a jumper before the chute is fully deployed. However, such a device cannot be removed from the suspension lines of the parachute. U.S. Pat. No. 1,266,508 to Ludtke on May 14, 1918 teaches a similar device with similar drawbacks. U.S. Pat. No. 2,566,585 to Smith on Sep. 4, 1951 teaches a similar device, again with similar drawbacks. More recently U.S. Pat. No. 5,005,785 to Puskas on Apr. 9, 1991 teaches a similar device with similar drawbacks.

Therefore, there is a need for a device that slows the jumper prior to the opening sequence of the main parachute to reduce opening shock forces. Such a needed device would be selectively fixed within close proximity to the jumper to allow the jumper to remove the device after the canopy is fully open, or not use the device at all if so desired. The present invention accomplishes these objectives.

SUMMARY OF THE INVENTION

The present device is a parachute deployment deceleration assist device for a jumper. The deceleration assist device of the present invention includes an inverted pocket formed from at least one web of material. The device further includes at least one removable harness attachment means fixed to a peripheral edge of the pocket. Each harness attachment means is selectively attachable to a harness assembly of a parachute between a canopy thereof and the jumper, preferably at a connector link and within easy reach of the jumper when the parachute is fully deployed.

Preferably each harness attachment means includes a metal ring fixed to the inverted pocket and a release. In one embodiment, the release includes a pull tab fixed at a distal end thereof to a retaining pin. In such an embodiment, the release further includes a length of flexible cord terminating in a retaining knot. The retaining pin is inserted through one of the connector links of the harness assembly and into the retaining knot, which selectively holds the retaining pin by friction and thereby holds the harness attachment means to the inverted pocket and the connector link of the harness assembly until the pull tab is pulled by the jumper to release the retaining pin from the training knot.

In use, before the canopy is inflated the inverted pocket inflates and aids in the deceleration of the jumper, reducing the shock experienced by the jumper upon full inflation of the canopy. Once the canopy is fully inflated and the jumper is falling at a substantially constant speed, the jumper may reach up to remove the device from the harness assembly.

The present device slows the jumper prior to the opening sequence of the main parachute to reduce opening shock forces. Moreover, the present invention is selectively fixed within close proximity to the jumper upon full deployment of the parachute, and allows the jumper to remove the device after the canopy is fully open. Alternately, the jumper may decide not use the device at all if so desired Other features and advantages of the present invention will become apparent from the following more detailed description, taken in conjunction with the accompanying drawings, which illustrate, by way of example, the principles of the invention.

DESCRIPTION OF THE DRAWINGS

FIG. 1 is an elevation view of a parachute with jumper;

FIG. 2 is an elevation view of an improved slider for a parachute deployment deceleration assist device of the invention, partially illustrating binding tape applied to the lower edge;

FIG. 3 is a side view of a quick-release assembly;

FIG. 4 is a perspective view of a riser attachment;

FIG. 5 is a perspective view of a jumper utilizing the assist device of the invention;

FIG. 7 is a close-up perspective view of the device assembled into a parachute container.

DETAILED DESCRIPTION OF THE PREFERRED EMBODIMENT

Figure 6:
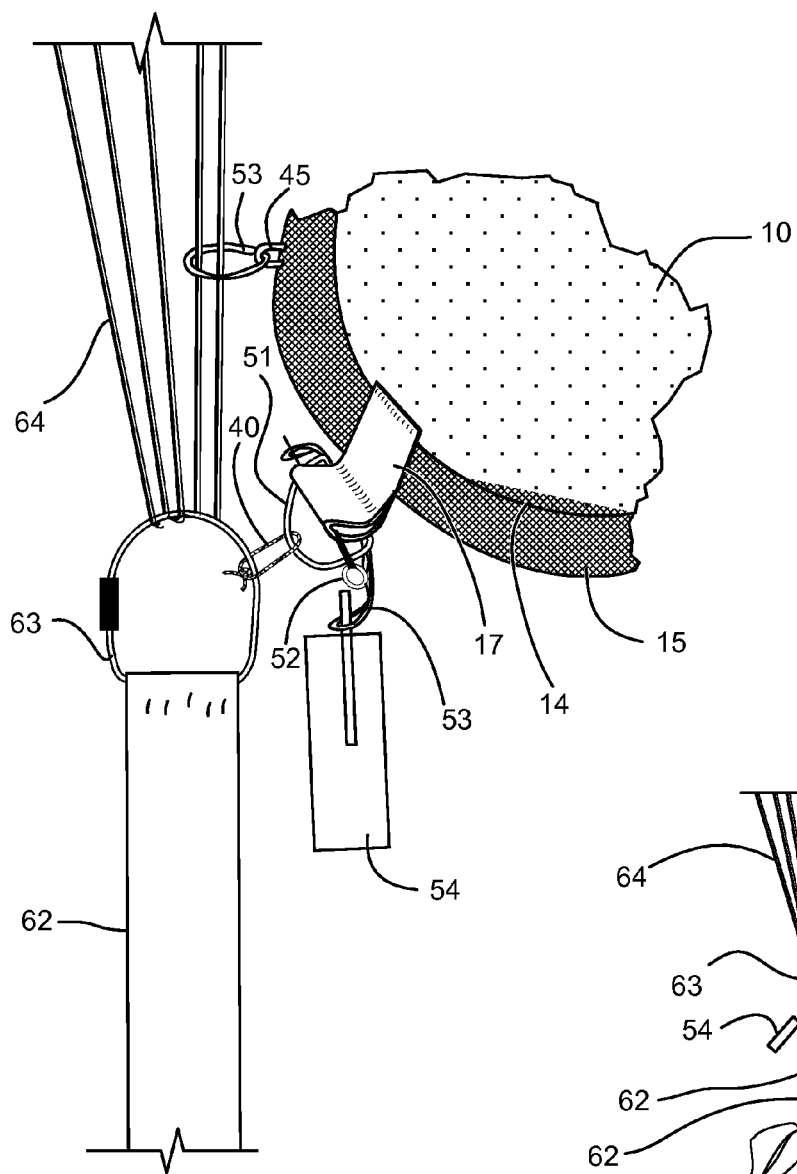
FIG. 6 is a close-up perspective view of the assembly of the improved slider, quick-release tab, pin attachment line, and "D" ring.
Figure 8:
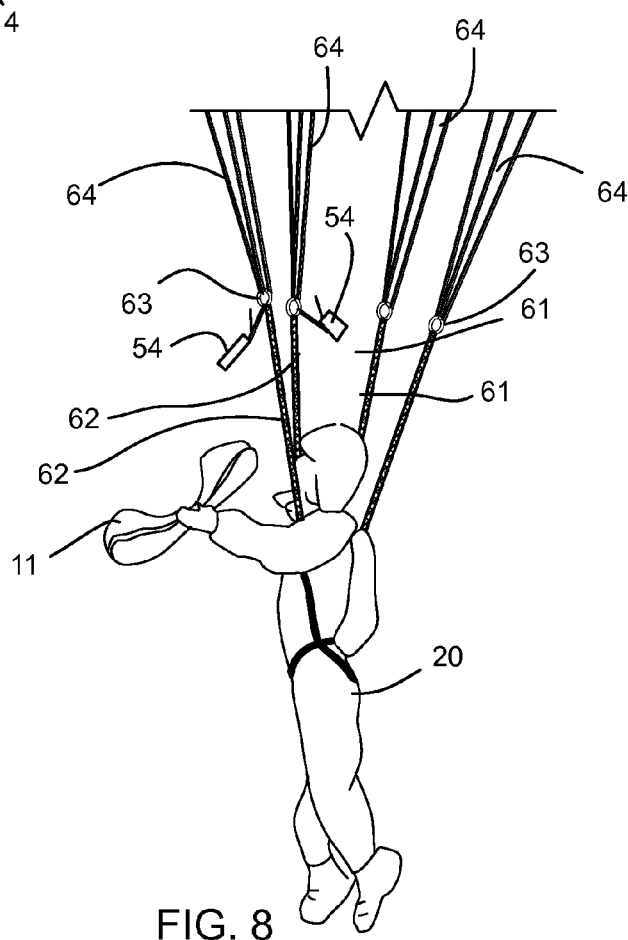
FIG. 8 is a perspective view of the jumper holding the improved slider after stabilizing the canopy.

FIGS. 1 and 2 illustrate a parachute deployment deceleration assist device 10 for a jumper 20. The jumper 20 has a parachute 5 that includes at least a canopy 30 and a harness assembly 50, the harness assembly 50 typically comprising a back riser 61 and a front riser 62 both terminating at a connector link 63. The connector link 63 is then fixed to a plurality of suspension lines 64 which each terminate at a top end thereof at the canopy 30. In use the parachute 5 includes a canopy bag 81 (FIG. 5) that holds the canopy 30 in a folded configuration. A pilot chute 110 typically exits a parachute container 60 (FIG. 7) fixed to the jumper 20 and pulls the canopy bag 81 away from the parachute container 60. Once the canopy bag 81 is clear of the parachute container 60, the canopy and its associated risers 61,62 and suspension lines 64 are pulled out of the canopy bag 81 to inflate the canopy 30 and decelerate the jumper 20 for a soft landing on the ground.

The deceleration assist device 10 of the present invention includes an inverted pocket 11 formed from at least one web 16 of material, each web 16 having an upper surface 18, a lower surface 19, and a peripheral edge 14 connecting the upper and lower surfaces 18,19. Each web 16 is preferably a strong nylon material, for example. Preferably the inverted pocket 11 is comprised of two of the webs 16, each of which takes the form of a trapezoid and each being sewn to the other along at least a portion of their peripheral edges 14 at a seam 12 (FIG. 2). A pressure-releasing vent 13 may be formed in a top portion of the inverted pocket 11.

The device 10 further includes at least one removable harness attachment means 32 fixed to the peripheral edge 14 of the pocket 11. Each harness attachment means 32 is selectively attachable to the harness assembly 50 of the parachute 5 between the canopy 30 and the jumper 20, preferably at one of the connector links 63 (FIG. 6) and within easy reach of the jumper 20 when the parachute 5 is fully deployed.

Preferably each harness attachment means 32 includes a metal ring 65 fixed to the inverted pocket 11 and a release 80 (FIGS. 3 and 4). In one embodiment, the release 80 includes a pull tab 73 (FIG. 4) fixed at a distal end 71 thereof to a retaining pin 72. In such an embodiment, the release 80 further includes a length of flexible cord 75 terminating in a retaining knot 74. The retaining pin 72 is inserted through one of the connector links 63 of the harness assembly 50 and into the retaining knot 74, which selectively holds the retaining pin 62 by friction and thereby holds the harness attachment means 32 to the inverted pocket 11 and the connector link 63 until the pull tab 73 is pulled by the jumper 20 to release the retaining pin 72 from the training knot 74. The pull tab 73 may be a length of flexible cord, strap material sewn together with stitching 77, or the like. An alternate embodiment of the release 80 is illustrated in FIG. 3 and includes a lanyard 54 as the pull tab 73, a D-ring for fixing to the harness assembly 50, and a retaining pin 52 that selectively engages an elastic band 52.

The device 10 may, in an alternate embodiment, further include a pair of attachment loops 17 fixed to the seam 12, each loop 17 for receiving one of the elastic band 53 therein and made from a loop of flexible nylon strap material, for example. Each elastic band 53 receives a portion of the harness assembly 50, preferably along at least one of the suspension lines 64 (FIGS. 2 and 5). As such, the attachment loops 17 and elastic bands 53 properly orient the inverted pocket 11 upon deployment of the parachute 5.

Preferably each ring 65 is a ⅜" metal ring. The inverted pocket 11 is preferably 40" to 41" in length at the base, and have a height of about 16". The acute angles of the trapezoid shaped webs 16 are preferably between 40 and 50 degrees. Other embodiments having a 50" to 53" base and a height of 20" to 22" are also contemplated.

In use, before the canopy 30 is inflated the inverted pocket 11 inflates and aids in the deceleration of the jumper 20, reducing the shock experienced by the jumper 20 upon full inflation of the canopy 30. Once the canopy 30 is fully inflated and the jumper 20 is falling at a substantially constant speed, the jumper 20 may reach up to remove the device 10 from the harness assembly 50.

While a particular form of the invention has been illustrated and described, it will be apparent that various modifications can be made without departing from the spirit and scope of the invention. For example, various shapes of the inverted pocket 11 may be utilized, and various types of harness attachment means 32 may be devised, provided that the two work together to assist in the deceleration of the jumper 20 prior to the full inflation of the canopy 30 and remain within easy reach of the jumper 20 thereafter. Accordingly, it is not intended that the invention be limited, except as by the appended claims.

What is claimed is:

1. A parachute deployment deceleration assist device for a jumper with a parachute that has a canopy and harness assembly, the device comprising:
   an inverted pocket formed from at least one web of material, each web having an upper surface, a lower surface, and a peripheral edge connecting the upper and lower surfaces; and
   at least one removable harness attachment means fixed to the peripheral edge of the pocket, each removable harness attachment means selectively attachable to the harness assembly of the parachute between the canopy and the jumper;
   whereupon with the jumper being in free-fall and deploying the parachute, the inverted pocket expands to an open position before the canopy does, thereby partially decelerating the jumper before the canopy of the parachute more fully decelerates the jumper.

2. The device of claim 1 wherein the inverted pocket is comprised of two of the webs, each being a trapezoid and sewn together along at least one portion of their peripheral edges at a seam.

3. The device of claim 2 further including at least a pair of attachment loops fixed to the seam, each attachment loop for receiving an elastic band therein, each elastic band for receiving a portion of the harness assembly therein, the attachment loops and elastic bands properly orienting the inverted pocket upon deployment of the parachute.

4. The device of claim 1 wherein each removable harness attachment means includes a ring fixed to the inverted pocket and a release, the release including a pull tab fixed at a distal end to a retaining pin and a length of cord terminating in a retaining knot, the retaining pin for inserting through a connector link of the harness assembly and into the retaining knot, the retaining knot holding the retaining pin and the removable attachment means to the inverted pocket until the pull tab is pulled by the jumper to release the retaining pin from the retaining knot.

5. The device of claim 4 wherein the pull tab is a lanyard.

6. The device of claim 1 wherein a top portion of the inverted pocket includes a pressure releasing vent.

7. A parachute comprising:
   a harness assembly for mounting said parachute to a jumper;
   a plurality of canopy suspension lines attached to said harness assembly;
   a canopy attached to said canopy suspension lines and contained within a canopy bag;
   a pocket attached to said harness assembly;
   whereupon with the jumper in free-fall and deploying the parachute said pocket is adapted to decelerate said jumper prior to said canopy being deployed from said canopy bag.

8. The parachute of claim 7, wherein said pocket is removably attached to said harness assembly in such a way as to be able to be removed by said jumper after said canopy has fully deployed.

9. The parachute of claim 8, wherein said pocket further comprises a ring fixed to the pocket and a release, the release including a pull tab fixed at a distal end to a retaining pin and a length of cord terminating in a retaining knot, the retaining pin for inserting through a connector link of the harness assembly and into the retaining knot, the retaining knot holding the retaining pin and the removable attachment means to the inverted pocket until the pull tab is pulled by the jumper to release the retaining pin from the retaining knot.

10. The parachute of claim 7 wherein the pocket is an inverted pocket comprised of two or more webs, each web being shaped as a trapezoid and sewn together along at least one portion of their peripheral edges at a seam.

11. The parachute of claim 10, wherein the pocket also includes at least a pair of attachment loops fixed to the seam, each attachment loop for receiving an elastic band therein, each elastic band for receiving a portion of the harness assembly therein, the attachment loops and elastic bands properly orienting the inverted pocket upon deployment of the parachute.

* * * * *